United States Patent [19]
Bennett

[11] Patent Number: 5,870,887
[45] Date of Patent: Feb. 16, 1999

[54] FORM-FILL-SEAL PACKAGING MACHINE

[75] Inventor: Robert Bennett, Birmingham, England

[73] Assignee: Ishida Co., Ltd., Kyoto, Japan

[21] Appl. No.: 996,428

[22] Filed: Dec. 22, 1997

[30] Foreign Application Priority Data

Dec. 23, 1996 [GB] United Kingdom .................... 9626785

[51] Int. Cl.⁶ .............................. B65B 51/30; B65B 9/20
[52] U.S. Cl. ............................................... 53/551; 53/552
[58] Field of Search .............................. 53/451, 551, 552, 53/554, 374.3, 375.4, 375.9, 375.3

[56] References Cited

U.S. PATENT DOCUMENTS

| | | | |
|---|---|---|---|
| 2,237,119 | 4/1941 | Smith | 53/552 |
| 2,950,588 | 8/1960 | Gausman | 53/552 |
| 3,027,696 | 4/1962 | Leasure | 53/552 X |
| 3,256,673 | 6/1966 | Tew et al. | 53/551 |
| 4,199,919 | 4/1980 | Moscatelli | 53/552 |
| 4,241,563 | 12/1980 | Muller et al. | 53/552 X |
| 4,750,313 | 6/1988 | Kammler et al. | 53/552 X |
| 4,947,618 | 8/1990 | Schneider et al. | 53/552 X |
| 5,347,795 | 9/1994 | Fukuda | 53/552 |
| 5,398,486 | 3/1995 | Kauss et al. | 53/552 X |

FOREIGN PATENT DOCUMENTS

| | | |
|---|---|---|
| 0228362A1 | 4/1983 | European Pat. Off. . |
| 0712782A1 | 11/1994 | European Pat. Off. . |
| 2266509 | 4/1992 | United Kingdom . |

Primary Examiner—Horace M. Culver
Attorney, Agent, or Firm—Staas & Halsey

[57] ABSTRACT

A form-fill-seal packaging machine in which a packaging material (F) is sealed crosswise by bringing a pair of sealing jaws (41, 42) into contact with each other. The sealing jaws (41, 42) are caused to follow the packaging material along the packaging material transfer direction while they are kept in the same condition, to cause the sealing jaws to take contacting and following motions by means of a single drive source. The rotation of a motor (25) is converted into a linear reciprocating motion along the transfer route of the packaging material through a cam mechanism comprised of a circular cam plate (24) and an arm (33) and the converted reciprocating motion is transmitted to a block (30). Similarly, the rotation of the motor (25) is converted into a linear reciprocating motion in a direction intersecting the packaging material transfer route at right angles through vertically elongated cam plates (50, 50) and the converted reciprocating motion is transmitted to blocks (37, 38). Thus, by supporting these blocks (37, 38) by the block 30, it is possible to allow the sealing jaws (41, 42) to take elevating and contacting motions using the single motor (25).

6 Claims, 5 Drawing Sheets

FORM-FILL-SEAL PACKAGING MACHINE

CROSS REFERENCE TO RELATED APPLICATIONS

This application is based upon and claims priority from British Patent Application number 9626785.1 filed Dec. 23, 1996, the contents of which are incorporated by reference.

BACKGROUND OF THE INVENTION

1. Field of the Invention

The present invention relates to a form-fill-seal packaging machine for forming a band-like film into packaging bags and sealing products into the packaging bags in sequence.

2. Description of the Related Art

Generally, a form-fill-seal packaging machine which forms a band-like film into packaging bags and seals products into the bags in sequence is constructed as disclosed in Japanese Unexamined Patent Publication No. H3-1362. The band-like film played out from a roll is formed into a tube with the side edges thereof held overlapped while the film is transferred along a transfer route. The overlapped side edges of the tubular film are bonded (lap, fin or pinch sealed for example). The lower end of the tubular film is sealed laterally. The products are supplied into the tubular film, and then the upper end of the tubular film is laterally sealed to separate the sealed tubular film from the remaining portion so that packaging bags each having the product sealed therein are produced in sequence.

In the above case, the sealing of the tubular film in the lateral direction is generally performed by heating and pressure-bonding the tubular film by bringing a pair of devices called sealing jaws arranged across the film transfer route into contact with each other. In this case, however, the method of bringing the sealing jaws into contact with each other by reciprocating the jaws in directions in which they come in contact with, and separate from, each other has the disadvantage that since the sealing of the film can be made only at the point of contact between the pair of sealing jaws, the transfer of the film has to be stopped for a time required for sealing. To avoid such a disadvantage, there has conventionally been known a method in which the sealing jaws are reciprocated in directions in which they come into contact with, and move away from, each other and also reciprocate along the film transfer route and when the sealing jaws are held in contact with each other, they are moved in the film transfer direction while they are held in the same condition. They thereby follow the tubular film so that the tubular film is laterally sealed as it is continuously transferred.

However, the conventional form-fill-seal packaging machine causing such sealing jaws to make such a motion has had the disadvantage costs are increased since two drive sources are required, one to drive the sealing jaws in which they reciprocate toward and away from each other and a second drive source to move the sealing jaws along the film transfer route. Especially, where the sealing jaws are reciprocated along the film transfer route by the second drive source, since the first drive source is also reciprocated, the inertia of the reciprocating motions becomes too large to increase the operating velocity of the machine and the second drive source is required to be an expensive large power type resulting in further increases in the manufacturing cost.

SUMMARY OF THE INVENTION

In accordance with the present invention, a form-fill-seal packaging machine of the type in which a band-like film is formed into a tube as it is transferred along a transfer route comprises a pair of lateral sealing devices arranged opposite to each other across the transfer route, whereby the sealing devices are brought into contact with each other to clamp the band-like film thereby sealing the film in the lateral direction. The lateral sealing devices are also movable in the transfer direction of the film. A support member is mounted on the main body of the machine so as to reciprocate along the transfer route of the film and is capable of supporting the pair of lateral sealing devices in a direction normal to the film transfer route while allowing the lateral sealing devices to come into contact with, and to separate from, each other. A driver is mounted in the main body of the machine so as to generate a rotary motion. A power transmission mechanism converts the rotary motion generated by the driver into a reciprocating motion in a direction along the film transfer route and transmits it to the support means. A contact transmission mechanism converts the rotary motion generated by the drive means into a reciprocating motion in a direction normal to the transfer route of the film and transmits it to at least one of the lateral sealing devices supported by the support member.

The present invention provides a form-fill-seal packaging machine of the type in which a pair of sealing jaws are caused to take a box motion by using a single drive source. In this case, the inertia of reciprocating motions of the sealing jaws is controlled to be as small as possible, thereby increasing the operating velocity of the sealing jaws and allowing the use of a small power type drive source.

The rotary motion by the driver mounted in the main body of the packaging machine is converted into a reciprocating motion coming close to, and moving away from, the film transfer route by the contact transmission mechanism and into a reciprocating motion along the film transfer mechanism by the feed transmission mechanism. The pair of lateral sealing devices is caused to contact each other by the first reciprocating motion and to move by following the film by the second reciprocating motion so that it is possible to cause the lateral sealing devices to make a box motion by the single driver.

Also in the above case, since the driver is mounted on the main body of the machine so as not to reciprocate together with the lateral sealing devices so that the inertia of the reciprocating motions does not become large, the operating velocities of the devices is increased and at the same time, a powerful drive means is not required.

Preferably, the contact transmission mechanism and the feed transmission mechanism convert the rotary motion of the driver in such a manner that when the amount of driving for the reciprocating motion of one of the two mechanisms is large, the rotational motion of the driver is so converted that the reciprocating motion of the other mechanism becomes small.

Thus, when the rotary motion of the driver is exclusively converted by the contact transmission mechanism and consumed for the reciprocating motion in a direction in which the lateral sealing devices come close to, and move away from, each other, the consumption by the feed transmission mechanism is controlled. On the contrary, when the rotational motion of the driver is converted exclusively by the feed transmission mechanism and consumed for the reciprocating motion of the lateral sealing devices in the direction along the film transfer route, the consumption by the contact transmission mechanism is controlled so that a large power type driver is not needed.

In some cases, there may be provided transfer units for transferring the band-like film along the transfer route. The moving velocity of the feed transmission mechanism when the lateral sealing devices are held in contact with each other is set lower than the transfer velocity of the film.

In these cases, since the transfer velocity of the lateral sealing devices is lower than the tubular film transfer velocity, the bottom of the tubular film curing lateral sealing of the tubular film expands so that the filling efficiency of the supplied product is improved. It is possible to avoid trapping the product at the upper lateral sealing position of the packaging bag.

BRIEF DESCRIPTION OF THE DRAWINGS

These and other advantages and features of the present invention, as well as methods of operation and economies of manufacture, will become apparent to one skilled in the art to which the present invention pertains based upon the following detailed description and the appended drawings, all of which form a part of this application. In the drawings.

DETAILED DESCRIPTION OF THE PRESENTLY PREFERRED EMBODIMENTS

Figure 1:
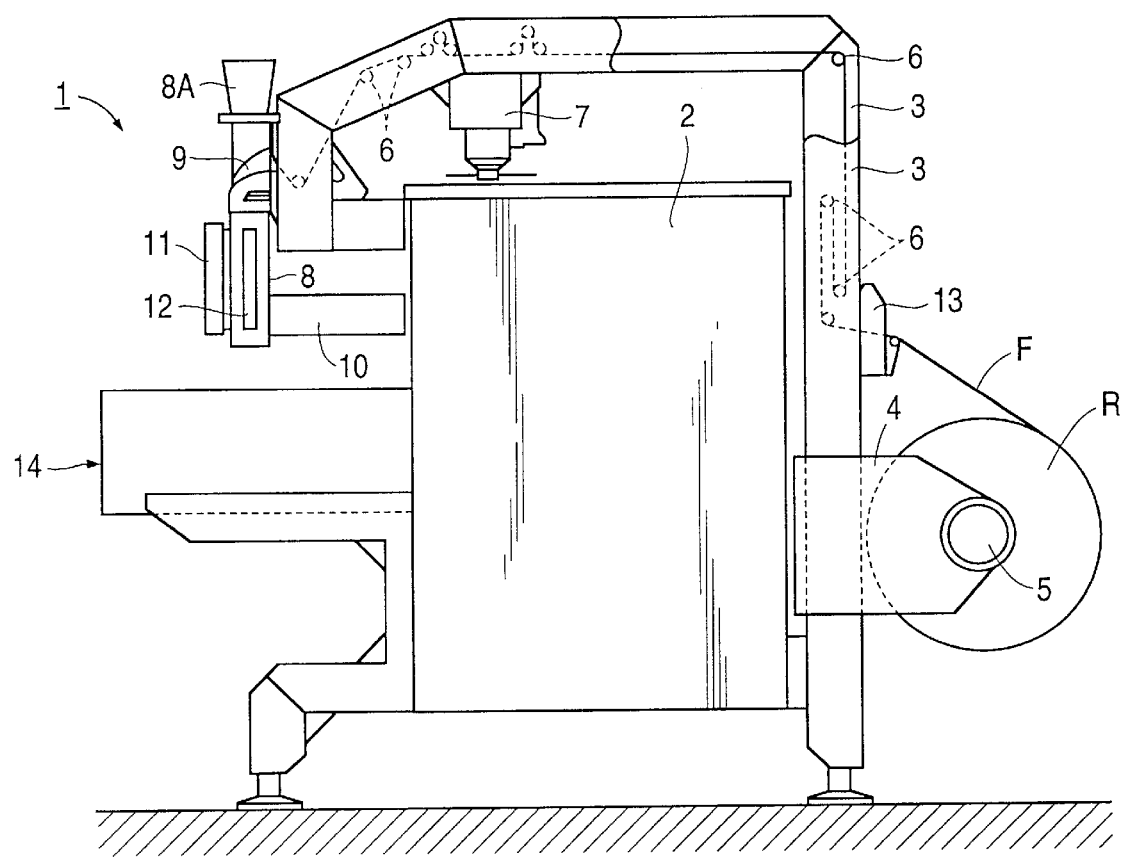
FIG. 1 is a schematic side view of the entire structure of a form-fill-seal packaging machine according to an embodiment of the present invention.

FIG. 1 is a schematic side view of a form-fill-seal packaging machine 1 according to a first embodiment of the present invention. The entire structure of the form-fill-seal packaging machine 1 and the flow of a film F will be described by referring to FIG. 1. The machine 1 is of the type that transfers the film F continuously. Machine 1 includes a pair of right and left frames 3, 3 extending from the rear of the machine main body 2 toward the upper portion and then to the front portion thereof. A roll R of the band-like film F is rotatably supported at the rear parts of the frames 3, 3 through a support bracket 4 and a drive shaft 5. The film F played out from the roll R is guided by a plurality of rollers 6 mounted between the frames 3, 3 during which the film F is printed with a manufacturing date by a printing device 7 arranged above the frames 3, 3. Then, the film F is transferred to the front portion of the main body 2 along the frames 3, 3.

In front of the frames 3, 3, there are provided a cylindrical chute 8 extending vertically so as to allow products to be supplied thereinto from an upper, funnel shaped hopper 8A, and a forming unit 9 of a predetermined shape for surrounding the chute 8 whereby the band-like film F transferred along the frames 3, 3 is wound around the peripheral surface of the chute 8 through the forming unit 9 to be formed into a tube with both side edges of the film F overlapped. In this state, the film F is further transferred downward along the chute 8.

Further, in front of the cylindrical chute 8, there is arranged a vertical sealing device 11 so as to lie opposite the chute 8. The device 11 is mounted on an L-shaped support arm 10 extending forward from the main body 2 so as to embrace the chute 8 so that both side edges of the film F that overlap on the peripheral surface of the chute 8 are compressed toward the chute 8 by the vertical sealing device 11 and bonded together by being heated as they are. In other examples where fin or pinch seals are performed, different forming units 9 will be used.

On opposite sides of the cylindrical chute 8, there are provided a pair of right and left feed or traction belts 12, 12 (only one is shown) which transfer the tubular film on the chute 8. The band-like film played out from the roll R is continuously transferred along the transfer route without excessive tensile force applied thereon, by the continuous driving of the feed belts 12, 12 arranged in front of the main body 2 of the machine 1 and the rotation of the drive shaft 5 supporting the film roll R. Above the film roll R, there is arranged a splicer 13. Below the cylindrical chute 8, there is provided a lateral device 14 which laterally seals the tubular film hanging down from the chute 8. Lateral device 14 incorporates therein a cutter for cutting the preceding portion of the film from the succeeding portion of the film at the central position of the sealed portion.

The lateral sealing device 14 is so constructed that it is provided with a pair of sealing jaws for sealing the tubular film laterally by pressure-heating and moving the film downward while keeping the film clamped whereby the tubular film or the band-like film F is laterally sealed as it is transferred continuously without stopping the tubular film or band-like film F every time when it is laterally sealed. Further, subsequent to the lateral sealing of the tubular film by the lateral sealing device 14, products are supplied one by one into the chute 8 from the hopper 8A and into the tubular film continuously transferred downward so as to be sealed laterally and cut resulting in discharging packaging bags in sequence.

Figure 2:
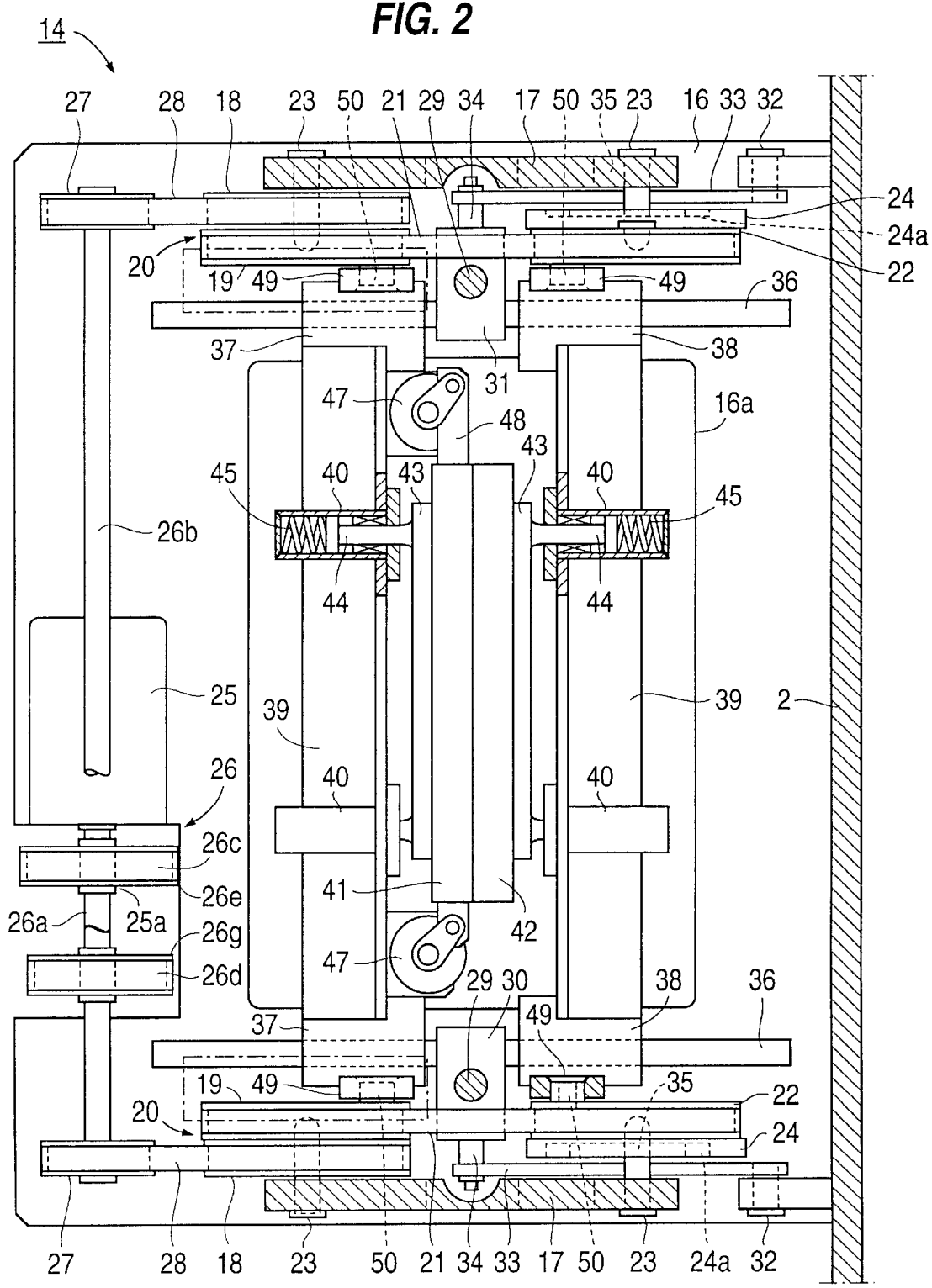
FIG. 2 is a cross-sectional view of a lateral sealing device of the form-fill-seal packaging machine of FIG. 1.
Figure 3:
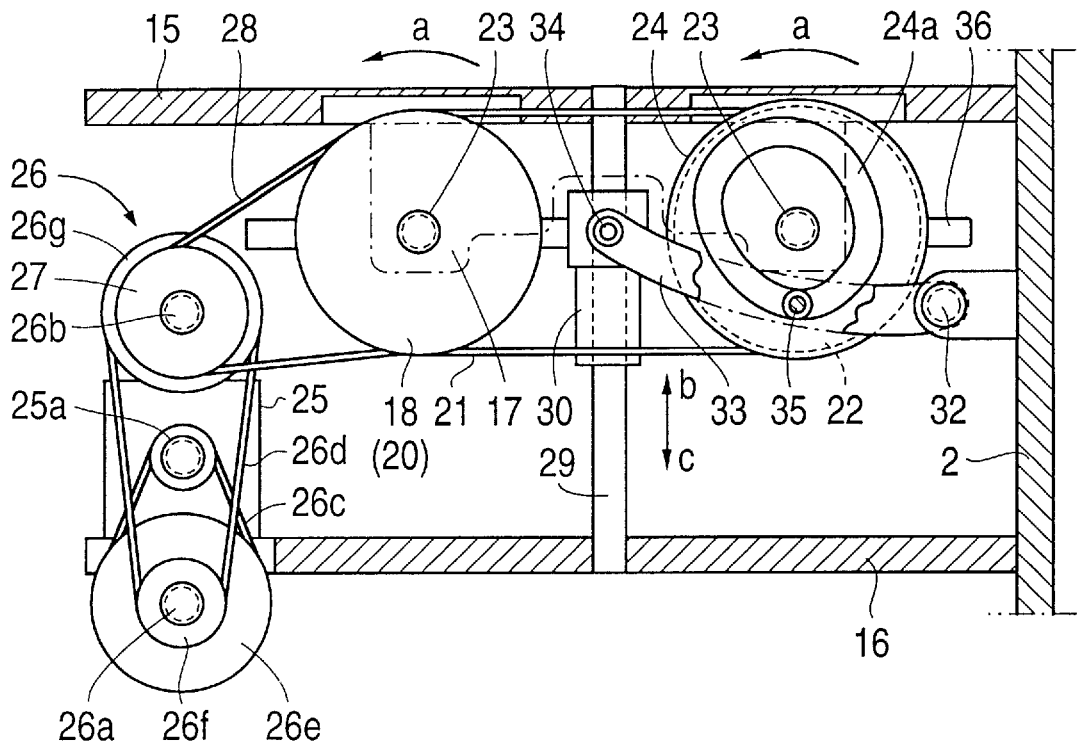
FIG. 3 is a vertical sectional view of the lateral sealing device of FIG. 2.
Figure 4:
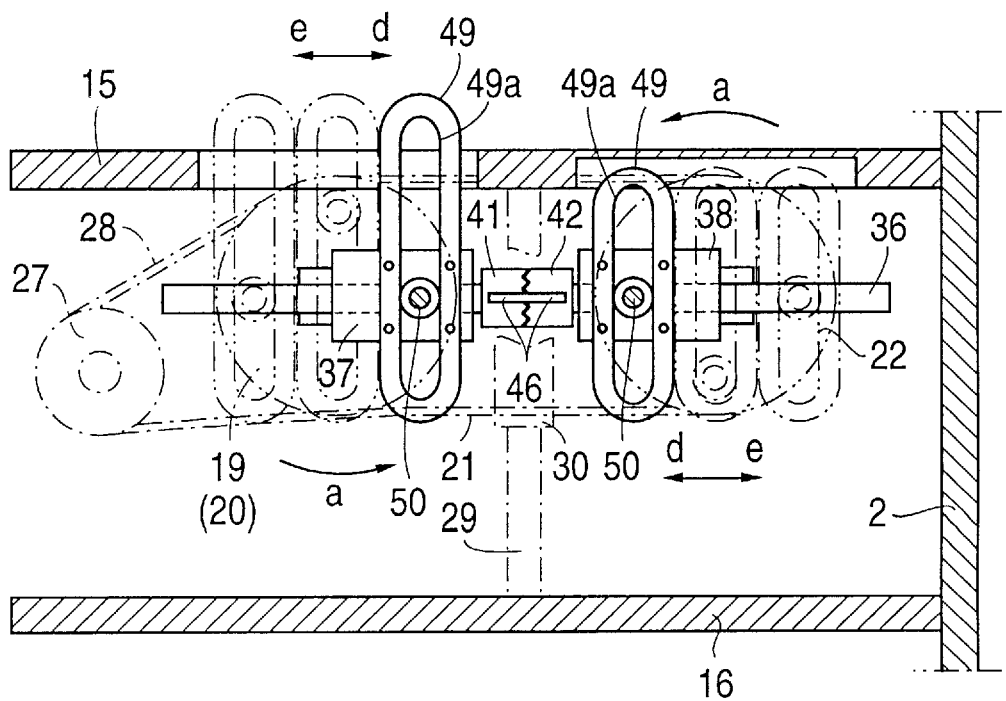
FIG. 4 is a vertical sectional view of another portion of the vertical sectional view of the lateral sealing device of FIG. 2.

As shown in FIGS. 2 to 4, the lateral sealing device 14 includes a ceiling plate 15 extending forwardly of the machine main body 2 and a bottom plate 16, which may be omitted. The tubular film f hanging down from the cylindrical chute 8 passes downward through openings 15a and 16a (see FIG. 8) provided at the center of the ceiling plate 15 and the bottom plate 16, respectively. As the film F passes through the openings 15a and 16a, the tubular film f is laterally sealed and cut by the sealing jaws provided between the plates 15 and 16.

On both right and left side edges of the ceiling plate 15, there are provided bearing members 17, 17 and in front of the bearing members 17, 17, there are provided double pulleys 20, 20. Each of the double pulleys 20 comprises two integrally rotating pulleys 18, 19. At the rear of the bearing members 17, 17, there are provided slave pulleys 22, 22, around which belts 21, 21 are passed, rotatably mounted on support shafts 23, 23, respectively. Between the inside pulleys 19, 19 and to each of the slave pulleys 22, 22, there is integrally attached a circular cam plate 24 having a cam groove 24a of a predetermined profile.

In front of the bottom plate 16, there is provided a servomotor 25 whose torque is transmitted to right and left transmission pulleys 27, 27 through a speed reducing mechanism 26 comprising a motor pulley 25a and a plurality of shafts 26a, 26b, belts 26c, 26d and pulleys 26e, 26f, 26g. By the operation of the servo motor 25, the front double pulleys 20, 20, the rear slave pulleys 22, 22 and the cam plates 24 are rotated in the direction of the arrow a through belts 28, 28 passed around the transmission pulleys 27, 27 and the outside double pulleys 18, 18.

Further, at the intermediate position between the front double pulleys 20, 20 and the rear slave pulleys 22, 22, shafts 29, 29 are erected so as to extend between the ceiling plate 15 and the bottom plate 16 and block members 30, 31 are slidably fitted about the shafts 29, 29, respectively. Each of the block members 30, 31 is rotatably attached to an oscillating end of a respective arm member 33, each of which oscillates about a supporting point 32 on the machine main body 2 through a pin 34. A roller member 35 rotatably provided at substantially the central portion of each arm member 33 is fitted in the respective cam groove 24a.

Further, through the block members 30, 31 there are provided shafts 36, 36, respectively, so as to extend forward and rearward in the horizontal direction and block members 37, 37 and 38, 38 are slidably fitted about the forward ends and the rearward ends of the shafts 36, 36, respectively. Then between the pairs of block members 37, 37 and 38, 38, there are provided beams 39, 39. A pair of front and rear sealing jaws 41, 42 are arranged opposite to each other across the transfer route of the tubular film passing through the openings 15a and 16a of the ceiling plate 15 and the bottom plate 16, through support mechanisms 40, 40 mounted on the beams 39, 39.

The sealing jaws 41, 42 are attached with base members 43,43, respectively, and cylinders 44, 44 formed on the base members 43, 43 are slidably fitted into the support mechanisms 40, 40, respectively. In this case, return springs 45, 45 are housed within the support mechanisms, respectively, so as to urge the cylinders 44, 44 and sealing jaws 41, 42 in the direction in which they come into contact with each other. FIGS. 2 and 4 show a state in which the pair of sealing jaws 41, 42 are in contact with each other.

Further, as shown in FIG. 4, the sealing jaws 41, 42 have slits 46, 46 formed crosswise, respectively. A cutter 48 coupled at each end to respective rotary solenoids 47, 47 is housed within the slit 46 of the front side sealing jaw 41 so that the cutter 48 rises from, and sets into, the front side jaw 41 and the sealed portion of the tubular film sealed in the cross direction by the contact of the front and rear sealing jaws 41, 42 is cut at the central portion thereof. Although not shown, on the opposing contact surfaces of the sealing jaws 41, 42 or on either one of the surfaces, there is provided a heater for heating and fusing the clamped film.

As an alternative to the rotary mechanism, the cutter could be mounted for linear movement via a piston cylinder arrangement or the like. To the block members 37, 37 and 38, 38 supporting the sealing jaws 41,42, there are respectively attached longitudinal cam plates 49, 49 having vertical holes 49a, 49a. At the same time, to the front and rear pulleys 19, 22 and 19, 22 around which the transmission belts 21, 21 pass, there are provided rollers 50, 50, which are phase-shifted by 180° forward and rearward. These rollers 50, 50 are fitted into the vertical holes 49a, 49a of the longitudinal cam plates 49, 49, respectively.

With the above structure, when the circular cam plates 24 are rotated in the direction of the arrow a by the operation of the servomotor 25, the arm members 33 oscillate vertically by following the cam grooves 24a of the cam plates 24 and the block members 30, 31 move vertically as indicated by the arrows a and b in FIG. 3. Consequently, the pair of front and rear sealing jaws 41, 42 which are supported by the block member 30 and the other block member 31 through the shafts 36, 36. The block members 37, 38 and 37, 38 also reciprocate vertically along the transfer route of the tubular film.

Similarly, when the front and rear pulleys 19, 22 and 19, 22 are rotated in the direction of the arrow a by the operation of the servomotor 25, the front and rear block members 37, 38 and 37, 38 attached to the longitudinal cam plates 49, 49 oscillate forward and rearward by following the rotation of the rollers 50, 53 on the pulleys 19, 22 and 19, 22 in the direction of the arrow a. The block members 37, 38 and 37, 38 come into contact with, and move away from, each other. Consequently, the pair of front and rear sealing jaws 41, 42 supported by the front and rear block members 37, 38 and 37, 38 also reciprocate forward and rearward, that is, in a direction intersecting at right angles with the transfer route of the tubular film.

Figure 5:
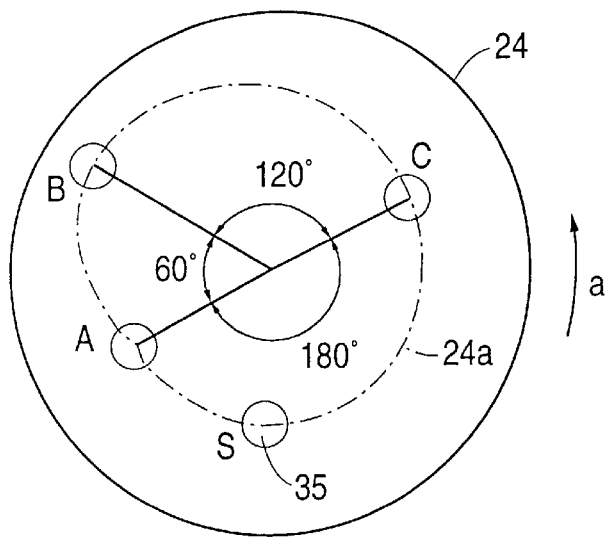
FIG. 5 is a diagram illustrating the characteristic of the profile of a circular cam plate of the lateral sealing device of FIG. 2.

In the above case, the profile of the cam grooves 24a of the circular cam plates 24 is such that as shown by a center line in FIG. 5, in the range of 180° from the point C to the point A, the cam groove has a predetermined radius. In the range of 60° from the point A to the point B, the radius thereof is enlarged. In the range of the remaining 120° from the point B to the point C, the radius thereof is reduced. Thus, when the cam plates 24 are rotated in the direction a at a predetermined angular velocity, the sealing jaws 41, 42 lie at the upper dead point in the range of the point C to the point A and in the range from the point B to the point C after lowering from the point A down to the point B and passing the lower dead point at the point B, they again move upward as shown in FIG. 6.

Figure 6:
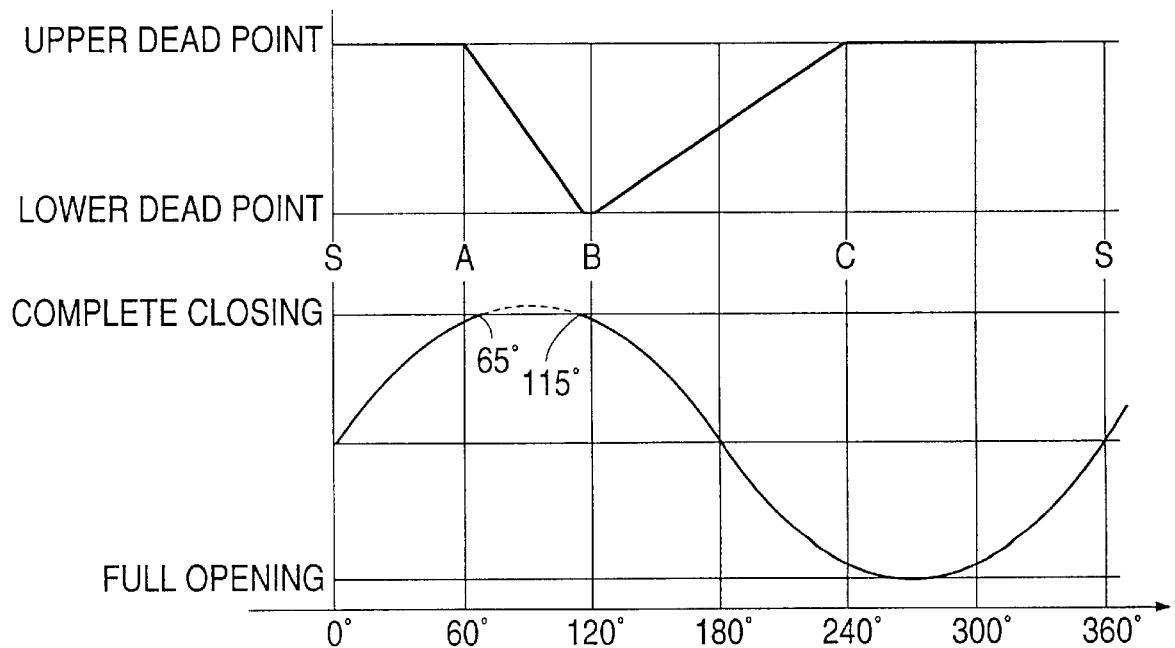
FIG. 6 is a time chart showing the moving amounts of sealing jaws in vertical and horizontal directions.

At the same time, the contact and separating motions of the sealing jaws 41, 42 come close to each other from the point C to the point A as shown in FIG. 6 and in the range between the point at an angular distance of 5° from the point A to the point at an angular distance of 5° before the point B, the sealing surfaces of the jaws come into contact with each other against the spring force of the return springs 45, 45 and then leave away from each other in the range from the point B to the point C.

Figure 7:
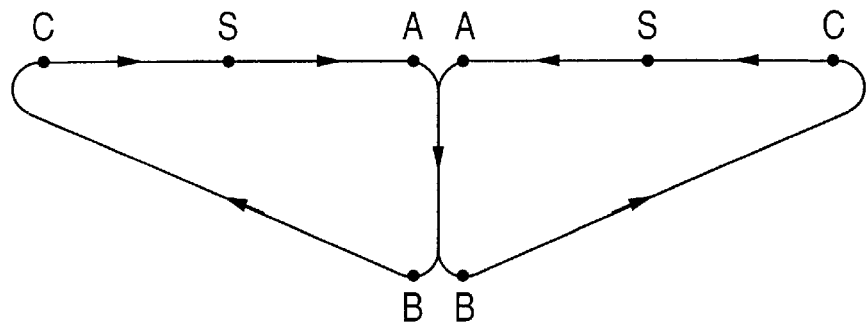
FIG. 7 is a diagram illustrating the entire operation of the sealing jaws of FIG. 6; and, FIG. 8 is a diagram illustrating the operation of the form-fill-seal packaging machine according to an embodiment of the present invention.

Consequently, the overall movement of the sealing jaws 41, 42 is such that as conceptually shown in FIG. 7, the sealing jaws begin to lower before they come into contact with each other and begin to move up after they move away from each other. Then, after continuously moving away from each other as they move up, they only come close to each other at the upper dead point.

Figure 8:
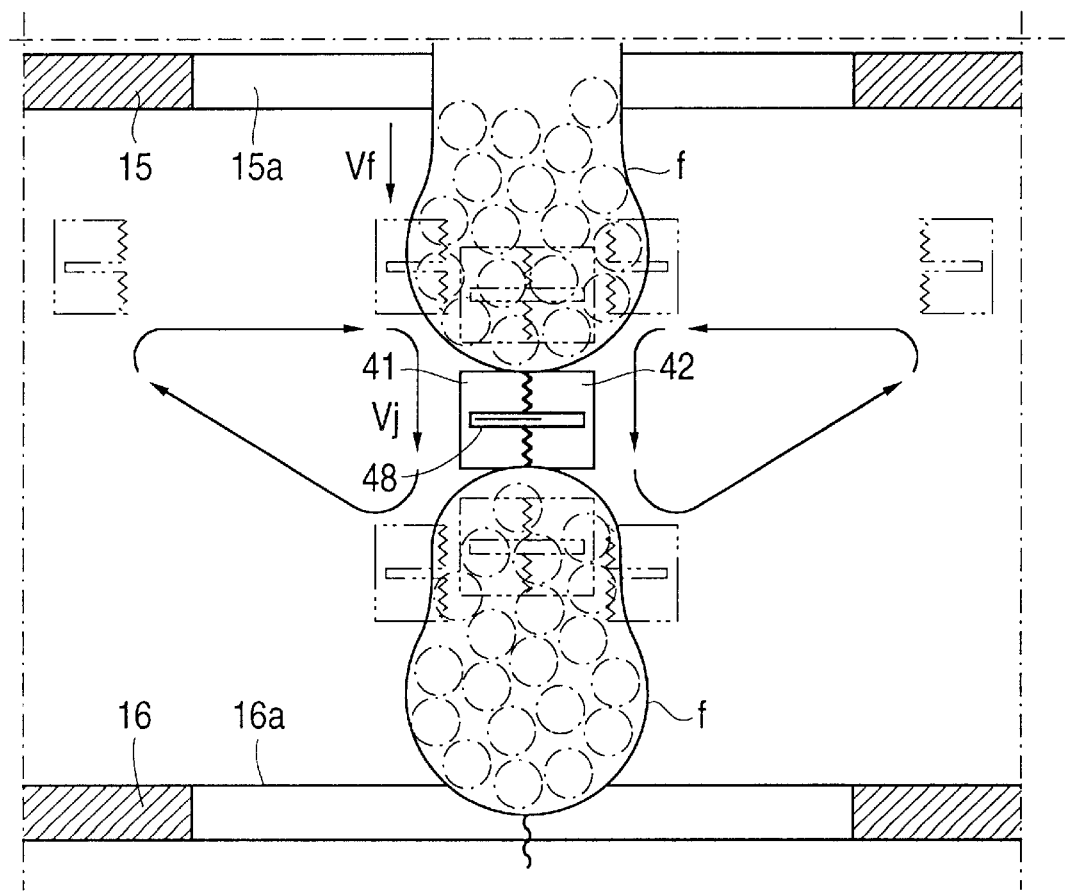

As a result of the above movements, the sealing jaws 41, 42 move downward while they are held in contact with each other as shown in FIG. 8, and during this period, it is possible to clamp the downwardly moving tubular film f for lateral sealing and cutting by the cutter 48 without temporarily stopping the transfer of the tubular film f.

In the above case, the rotation of the servomotor 25 is converted into reciprocating motions in directions along the route of transfer of the tubular film f by means of the circular cam plates 24 and the rollers 35 and into reciprocating motions in directions in which the sealing jaws come close to, and move away from, the route of film transfer by means of the longitudinal cam plates 49, 49 and the rollers 50, 50 so that the sealing jaws 41, 42 follow the film on one hand and come into contact with each other on the other hand thereby enabling the sealing jaws 41, 42 to move in vertical and horizontal directions by the single servomotor 25.

In the above case, the servomotor 25, the double pulleys 20, the slave pulleys 22, 22 or the circular cam plates 24, which transmit the driving power of the servomotor 25 converted into a linear reciprocating motion to the sealing jaws 41, 42, are mounted on the packaging machine body 2 so as not to move reciprocally with the sealing jaws so that the inertia of the reciprocating motion does not become large to increase the operating velocity of the machine. Thus, the servomotor 25 is not required to be of large power type.

Further, as shown in FIGS. 6 or 7, when the sealing jaws 41, 42 come close to each other from the point C to the point A during which the amount of lateral movement of the sealing jaws 41, 42 is small, the sealing jaws 41, 42 lower so that during this period, the driving power of the servomotor 25 does not scatter in two parts but is entirely converted into either of the two kinds of linear reciprocating motions. It is therefore apparent that the servomotor 25 is not required to be of large power type.

As described above, in the instant embodiment, the lowering velocity Vj of the sealing jaws 41, 42 at the time of their contact is made lower than the transfer velocity Vf of the tubular film f as shown in FIG. 8. Consequently, the bottom of the tubular film f at the time of lateral sealing gets bulged and the filling efficiency of the products X, X supplied to the tubular film f is improved thereby avoiding the biting of the product at the upper lateral sealing position of each packaging bag.

As described above, according to the present invention, the sealing jaws can be reciprocated linearly in both the vertical and horizontal directions by a single driving source and the inertia of the reciprocating motions can be minimized, so that the manufacturing cost can be decreased. Further, the use of a small power driving source is made possible thereby improving the operating velocity of the bag-making and packaging machine.

While the present invention has been described in connection with what are currently considered to be the most practical and preferred embodiments, it is to be understood that various arrangements and alternative embodiments are intended to be included within the scope of the appended claims.

What is claimed is:

1. A form-fill-seal packaging machine of the type in which a band-like film is formed into a tube as it is transferred along a transfer route, the machine comprising:
   a pair of lateral sealing devices arranged opposite to each other across the transfer route, whereby the sealing devices are brought into contact with each other to clamp the band-like film thereby sealing the film in the lateral direction, the lateral sealing devices also being movable in the transfer direction of the film;
   a support member mounted on the main body of the machine so as to reciprocate along the transfer route of the film and capable of supporting the pair of lateral sealing devices in a direction normal to the film transfer route while allowing the lateral sealing devices to come into contact with, and to separate from, each other;
   a driver mounted in the main body of the machine so as to generate a rotary motion;
   a power transmission mechanism to convert the rotary motion generated by the driver into a reciprocating motion in a direction along the film transfer route and to transmit said reciprocating motion to the support member; and
   a contact transmission mechanism to convert the rotary motion generated by the driver into a reciprocating motion in a direction normal to the transfer route of the film and transmitting it to at least one of the lateral sealing devices supported by the support member.

2. A machine according to claim 1, wherein said contact transmission mechanism and said feed transmission mechanism convert the rotary motion generated by said driver into reciprocating motion in such a manner that when the amount of driving by said driver for the reciprocating motion of one of both said transmission mechanisms is large, the amount of driving by said driver for the reciprocating motion of the other mechanism becomes small.

3. A machine according to claim 1, wherein there is provided a transfer mechanism to transfer the band-like film along the transfer route and a moving velocity of said transfer mechanism at the time when said lateral sealing devices are held in contact with each other is set lower than the velocity of transfer of said film by said transfer mechanism.

4. A form-fill-seal packaging machine of the type in which a band-like film is formed into a tube as it is transferred along a transfer route, the machine comprising:
   sealing means for clamping and thereby sealing the band-like film in the lateral direction when the sealing means are brought into contact with one another, the sealing means being disposed opposite to each other across the transfer route, the sealing means also being movable in the transfer direction of the film;
   support means for supporting the sealing means in a direction normal to the film transfer route while allowing the sealing means to come into contact and separate from each other, said support means being mounted on a main body of the machine so as to reciprocate along the transfer route of the film;
   drive means mounted in the main body of the machine for generating a rotary motion;
   power transmission means for converting the rotary motion generated by the drive means into a reciprocating motion in a direction along the film transfer route and transmitting it to the support means; and
   contact transmission means for converting the rotary motion generated by the drive means into a reciprocating motion in a direction normal to the transfer route of the film and transmitting it to the sealing means supported by the support means.

5. A machine according to claim 4, wherein said contact transmission means and said feed transmission means convert the rotary motion generated by said drive means into reciprocating motion in such a manner that when the amount of driving by said drive means for the reciprocating motion of one of both said transmission means is large, the amount of driving by said drive means for the reciprocating motion of the other transmission means becomes small.

6. A machine according to claim 4, further comprising a transfer means for transferring the band-like film along the transfer route and a moving velocity of said transfer means at the time when said sealing means are held in contact with each other is set lower than the velocity of transfer of said film by said transfer means.

* * * * *